United States Patent
Angtin et al.

(10) Patent No.: US 7,512,135 B2
(45) Date of Patent: Mar. 31, 2009

(54) METHOD FOR TRANSFERRING DATA AMONG A LOGICAL LAYER, PHYSICAL LAYER, AND STORAGE DEVICE

(75) Inventors: Matthew Joseph Angtin, Tucson, AZ (US); Kai Alan Gahn Asher, Tucson, AZ (US); David Maxwell Cannon, Tucson, AZ (US); Erick Christian Kissel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 11/009,897

(22) Filed: Dec. 10, 2004

(65) Prior Publication Data

US 2006/0126615 A1      Jun. 15, 2006

(51) Int. Cl.
*H04L 12/56* (2006.01)
*G06F 11/00* (2006.01)

(52) U.S. Cl. .................. 370/395.7; 370/395.72; 370/469; 711/202; 714/42

(58) Field of Classification Search .......... 370/389, 370/392–412, 469, 368, 371; 713/193; 711/100–173, 711/202; 709/243, 249; 714/43, 42; 710/52
See application file for complete search history.

(56) References Cited

U.S. PATENT DOCUMENTS

| | | | |
|---|---|---|---|
| 5,166,674 A | 11/1992 | Baum et al. | |
| 5,265,207 A | 11/1993 | Zak et al. | |
| 5,276,878 A | 1/1994 | Sutton et al. | |
| 5,490,168 A | 2/1996 | Phillips et al. | |
| 5,745,685 A | 4/1998 | Kirchner et al. | |
| 5,802,278 A * | 9/1998 | Isfeld et al. | 709/249 |
| 5,897,661 A * | 4/1999 | Baranovsky et al. | 711/170 |
| 6,038,604 A | 3/2000 | Bender et al. | |
| 6,038,606 A | 3/2000 | Brooks et al. | |
| 6,044,079 A | 3/2000 | Calvignac et al. | |
| 6,397,308 B1 | 5/2002 | Ofek et al. | |
| 2004/0039891 A1 | 2/2004 | Leung et al. | |
| 2004/0078534 A1 | 4/2004 | Scheid | |
| 2004/0098547 A1* | 5/2004 | Ofek et al. | 711/162 |

OTHER PUBLICATIONS

House, G., "Server-Free Backup/Restore", *White Paper*, © 2001 Crossroads Systems, Inc., pp. 1-5.
U.S. Patent Application, entitled "Transferring Data Between System and Storage in a Shared Buffer", filed Dec. 12, 2004, invented by Anglin, M.J., A.H. Hochberg, J. Viksne.

* cited by examiner

*Primary Examiner*—Afsar M. Qureshi
(74) *Attorney, Agent, or Firm*—David Victor; Konrad Raynes & Victor LLP

(57) ABSTRACT

Provided is a method for transferring data among a logical layer, physical layer, and storage device. The logical layer allocates a buffer to use to write data to a storage device. The physical layer manages access to the storage device. The logical layer determines an offset into the buffer based on a length of a physical header written by the physical layer and writes data to the buffer from the determined offset. The physical layer writes physical header information, wherein the physical header information does not extend past the offset in the buffer. The physical layer transfers content from the buffer to the storage device.

11 Claims, 5 Drawing Sheets

METHOD FOR TRANSFERRING DATA AMONG A LOGICAL LAYER, PHYSICAL LAYER, AND STORAGE DEVICE

BACKGROUND OF THE INVENTION

1. Field of the Invention

The present invention relates to a method, system, and program for transferring data among a logical layer, physical layer, and storage device.

2. Description of the Related Art

In a storage environment, data may be transferred among heterogeneous storage devices, such as sequential access devices (e.g., tape drives, optical disk drives, etc.) or random access storage devices (e.g., hard disk drives, electronic memory, Flash memory, etc.) A system attached to the storage devices may have a logical layer presenting a logical view of chunks of the data, also referred to as logical blocks that may be included within or span physical blocks in the storage device. The logical layer calls a physical layer to access the storage device. Both the logical and physical layers may add header information to the application data that includes information used to manage the data and error checking codes. The physical header may indicate the amount of data written to the storage device in the block and the logical block identifier.

The logical layer may allocate a buffer in memory to include data being transferred to the storage device. The logical layer performs a memory copy operation to transfer the data from the logical layer buffer to a physical layer Input/Output (I/O) buffer in which the physical layer adds physical header information before transferring data to the storage device. For instance, the logical layer fills a buffer with application data and a logical header. The physical layer then adds a physical header to an Input/Output (I/O) buffer and copies the data in the buffer used by the logical layer to the I/O buffer following the physical header added to the I/O buffer.

To perform a read operation, the logical layer maintains information associating a physical location at which a logical object is stored with a logical block identifier. An object may span multiple logical and physical blocks, or multiple objects may be contained within a single block. To retrieve an object, the logical layer requests the physical layer to read the block at the physical location associated with the object. The physical layer determines an offset into the buffer including the physical location that skips the physical header, where the logical layer is not aware of the physical header. The physical layer then performs two operations, one to read the entire physical block containing the logical block and physical header into the I/O buffer and a second to memory copy the block from the offset into the I/O buffer that skips the physical header. This memory copy operation copies the logical header and application data in the I/O buffer to a buffer allocated to the logical layer.

SUMMARY

Provided are a method, system, and program for transferring data among a logical layer, physical layer, and storage device. The logical layer allocates a buffer to use to write data to a storage device. The physical layer manages access to the storage device. The logical layer determines an offset into the buffer based on a length of a physical header written by the physical layer and writes data to the buffer from the determined offset. The physical layer writes physical header information, wherein the physical header information does not extend past the offset in the buffer. The physical layer transfers content from the buffer to the storage device.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
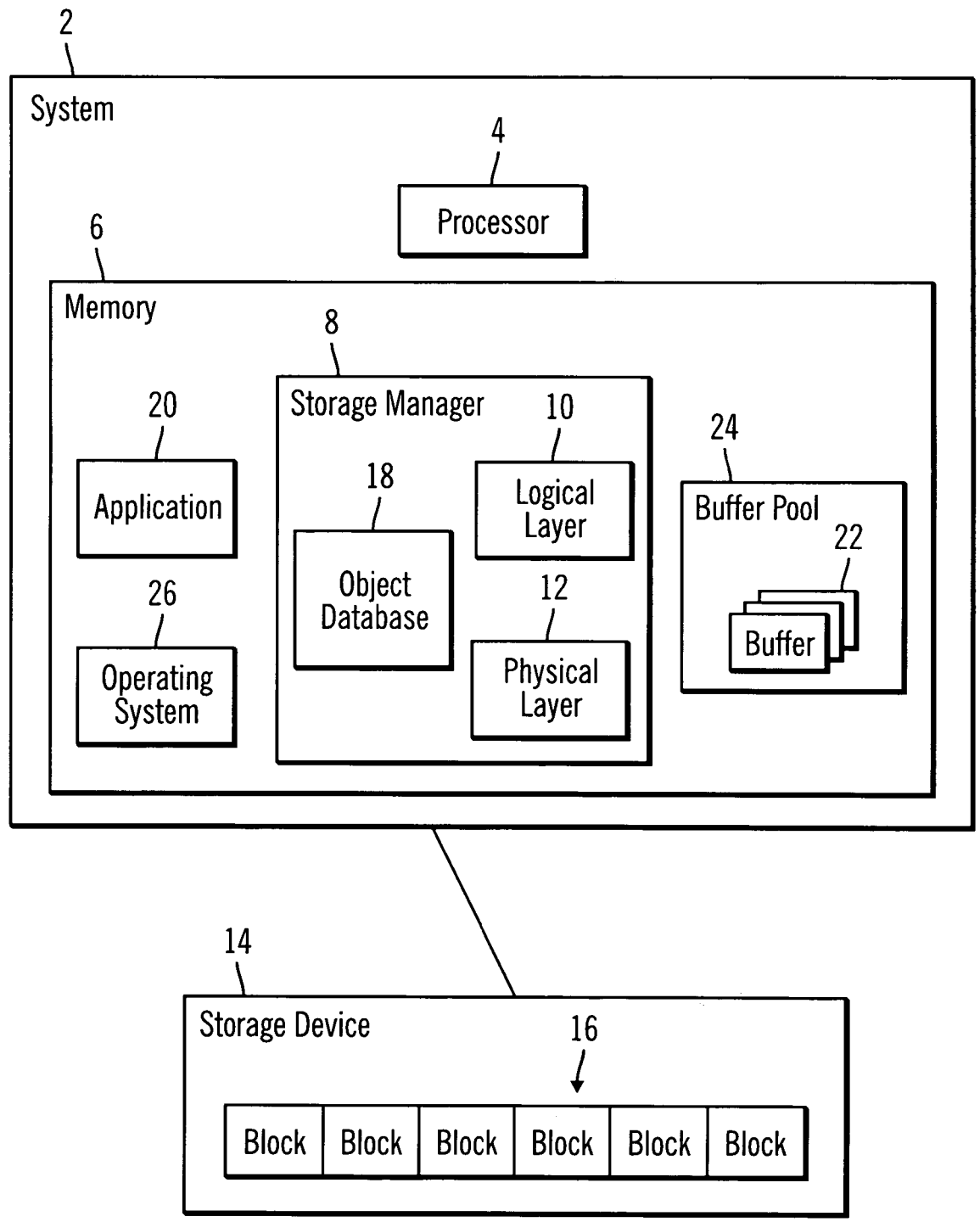
FIG. 1 illustrates an embodiment of a storage computing environment.

FIG. 1 illustrates a computing environment having a system 2 including a processor 4 and memory 6. An operating system 26 and storage manager 8 application are loaded into the memory 6. The storage manager 8 includes a logical layer 10 and a physical layer 12. The logical layer 10 provides information on data stored in a storage device 14 to applications 20. The logical layer 10 provides a view of the data in the storage device 14 as logical blocks and may provide a file system view. The logical layer 10 understands the layout of the data, but has no direct contact with the storage devices. The logical layer 10 communicates with a physical layer 18, which interacts with the device driver (not shown) and other components that are capable of directly accessing physical blocks of data 16 in the storage device 14. The physical layer 12 has direct contact with the storage devices, but has no understanding of the data being stored. The logical layer 10 passes I/O requests with respect to data in the storage device 14 to the physical layer 12 to process. The logical layer 10 may view the data in the storage device 14 as logical blocks, where the logical blocks may span the physical blocks of data 16 organized in the storage device 14. Further, one physical block 16 may include multiple logical blocks. The logical layer 10 maintains an object database 18 providing information on each object written to the storage device 14, including the physical location in the storage device 14 of the start of where the object is stored. As discussed, an object may span one or more physical blocks.

An application 20, executing in the memory 6 or some external device, communicates read/write requests for logical blocks of data to the logical layer 10, which provides the logical view of the data to the applications 20. The application 20 may transfer data the application 20 generates and maintains. Additionally, the application 20 may transfer data between the storage device 14 and another storage device (not shown), where the data may be transferred between heterogeneous storage devices. For instance, the application 20 may comprise a backup program to backup and restore data between one or more hard disk drives and a tape or other sequential access device backup.

The logical layer 10 allocates buffers 22 in a buffer pool 24 to store blocks of data. In the described embodiments, the logical layer 10 and physical layer 12 share the buffers 22.

The storage device 14 may comprise any suitable non-volatile storage device known in the art, such as sequential storage device, e.g., tape drive, optical disk, etc., or a random access storage device such as a hard disk drive or non-volatile electronic memory (e.g., flash memory). The system 2 may comprise a computer system known in the art capable of performing I/O access with respect to a storage device 14, such as a workstation, server, mainframe, desktop, laptop, handheld computer, telephony device, etc. The system 2 and storage device 14 may connect over a network, such as a Local Area Network (LAN), Storage Area Network (SAN), wireless network, the Internet, an Intranet, etc. In an alternative embodiment, the system 2 may connect to the storage device 14 via a cable or a bus interface, such as a Peripheral Component Interconnect (PCI) bus, Small Computer System Interface (SCSI) bus, etc. The storage device 14 may comprise an external storage device to the system 2 or an internal storage device coupled to the system 2 motherboard.

Figure 2:
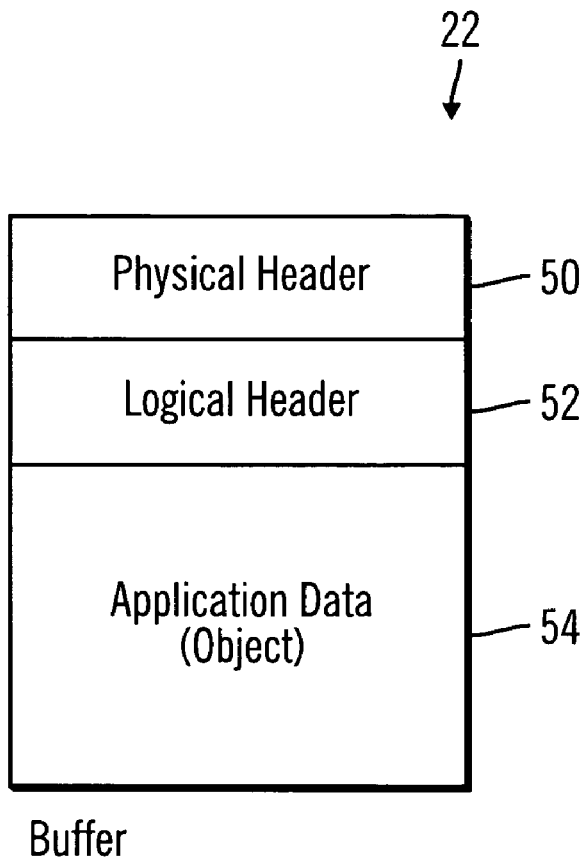
FIG. 2 illustrates an embodiment of a format of a buffer.

FIG. 2 illustrates information the logical layer 10 and physical layer 12 add to the buffer 22 for each block, including a physical header 50 written by the physical layer 12 including information the physical layer 12 uses to identify and verify the data, such as an identifier of the physical block and an error checking code used to verify the data; a logical header 52 written by the logical layer 10 including information the logical layer 12 uses to identify and verify the data, such as an identifier of the logical block and an error checking code; and the application data 54 written by the logical layer. With the described embodiments, the logical 10 and physical 12 layers communicate data to read or write to the storage device 14 by passing a pointer to the buffer to each other. In this way, the buffer 22 is shared by the logical 10 and physical 12 layers. The layers 10, 12 may process the data and add header and other information in the same shared buffer 22, thereby avoiding the need to perform memory copy operations of the data to and from separate buffers.

Figure 3:
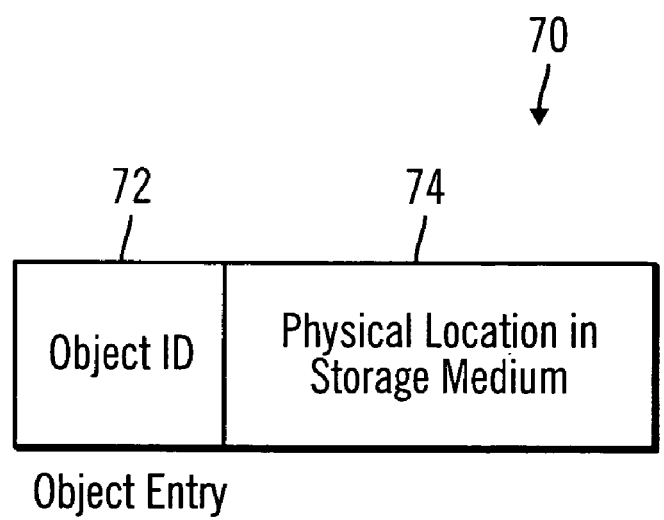
FIG. 3 illustrates information maintained associating a physical location with a logical block

FIG. 3 illustrates an entry 70 in the object database 18, including: an object identifier (ID) 72 and a physical location 74 identifying the physical location in the storage device 14 at which the object 72 begins. The object 72 may be included within one physical block 16 or span multiple physical blocks 16. In one embodiment, a logical block has a same length as a physical block 16. In embodiments where the storage device 14 comprises a sequential storage device, such as a tape driver, the blocks 16 may comprise sequential blocks on the sequential storage medium.

Figure 4:
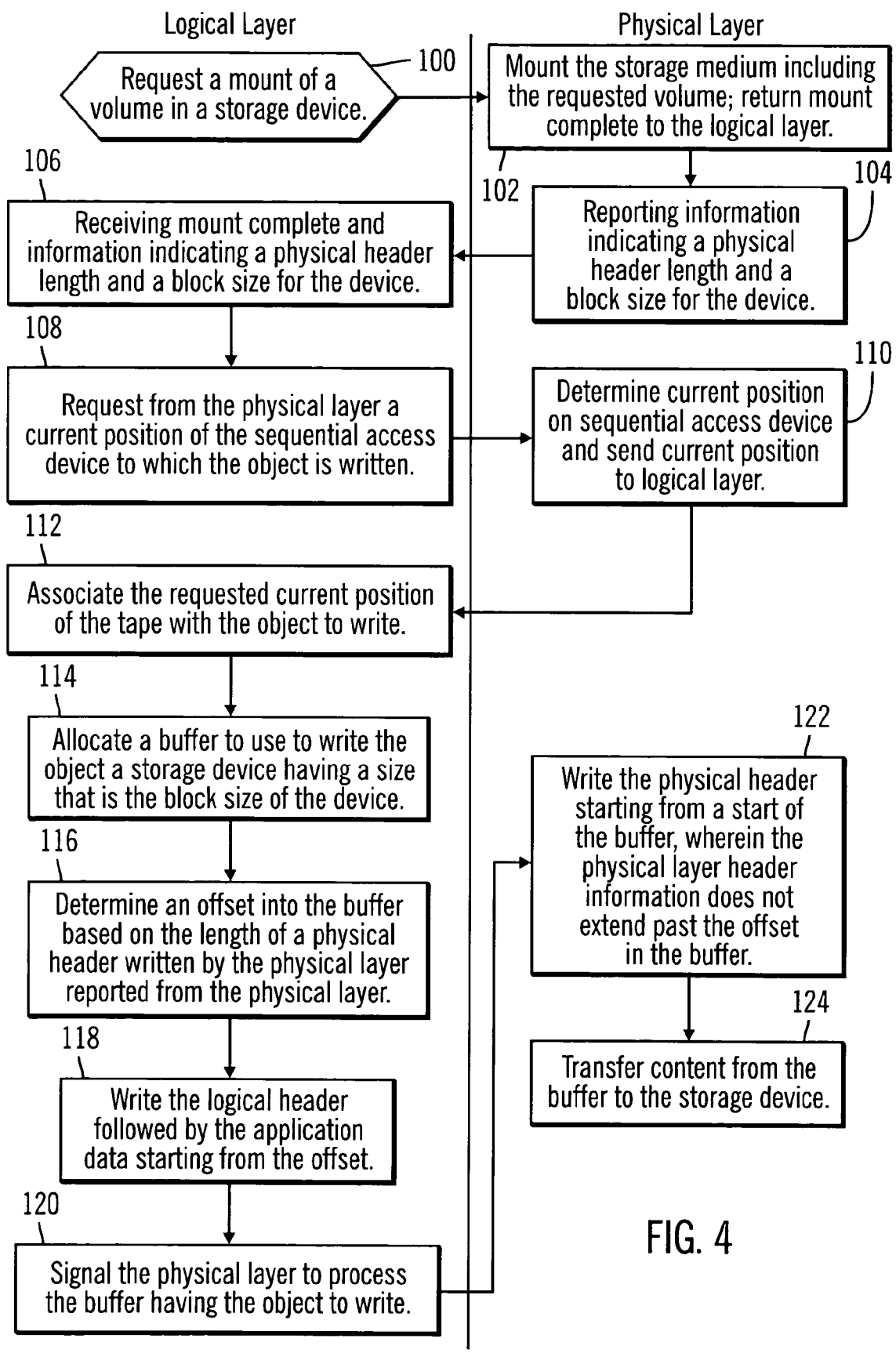
FIGS. 4, 5, and 6 illustrate an embodiment of operations to transfer data among a logical layer, physical layer, and storage device.

FIG. 4 illustrates an embodiment of operations performed by the logical layer 10 and physical layer 12 to transfer data to the storage device 14 from the application 20, which may be transferring an object from another storage device, such as a heterogeneous storage device. To initiate a write operation, the logical layer 10 requests (at block 100) a mount of a volume in a storage device. In an embodiment where the storage device 14 comprises a sequential access device, the volume may comprise a tape or storage cartridge that the physical layer 12 would cause to be inserted in a tape drive to access. The volume comprises physical blocks that contain logical blocks. Alternatively, the storage device 14 may comprise a random access storage device, such as a hard disk drive, flash memory, etc. In response to the mount request, the physical layer 12 issues commands to mount (at block 102) the storage medium including the requested volume and returns mount complete to the logical layer 10. When a tape is mounted for writing, the assumption is that the volume seeks to end. The physical layer 12 further reports (at block 104) to the logical layer 10 information indicating a physical header 50 (FIG. 2) length and a block 16 size for the device. In response to receiving (at block 106) the mount complete and information on the physical header 50 length and the device block size, the logical layer 10 requests (at block 108) from the physical layer 12 a current position of the sequential access device 14 to which the object is to be written. In one embodiment, the current position may comprise a physical location in the sequential access device at which a read/write head of the storage device 14 is positioned to write the object.

In response to the request of the current position, the physical layer 12 determines (at block 110) the current position on the sequential access device 14 and sends the determined current position to the logical layer 10. The logical layer 10 associates (at block 112) the requested current physical position 74 to which the object is written with the object being written, i.e., having object identifier 72 (FIG. 3), in the logical block database 18. The logical layer 10 further allocates (at block 114) a buffer 22 to use to write the object to the storage device 14 having a size that is the block size of the device. The logical layer 10 determines (at block 116) an offset into the buffer 22 based on the length of a physical header 50 (FIG. 2) written by the physical layer 12, where the length was reported from the physical layer at block 104. The logical layer 10 then writes (at block 118) the logical header 52 followed by the object starting from the determined offset. Writing from the offset leaves room at the top of the buffer 22 for the physical header 50 (FIG. 2).

After filling the buffer 22, the logical layer 10 signals (at block 120) the physical layer 12 to process the buffer 22 including the written object. In response, the physical layer 12 writes (at block 122) the physical header 50 starting from a start of the buffer 22, wherein the physical header 50 information does not extend past the determined offset into where the logical header 52 is written in the buffer 22. The physical layer 12 transfers (at block 124) the object from the buffer 22 to the storage device 14.

With the described embodiment of FIG. 4, the logical 10 and physical 12 layers share the same buffer 22 to fill with application data (objects) 54 and headers 50, 52, so that the physical layer 12 transfers the data from the shared buffer 22 directly to the storage device 14.

Figure 5:
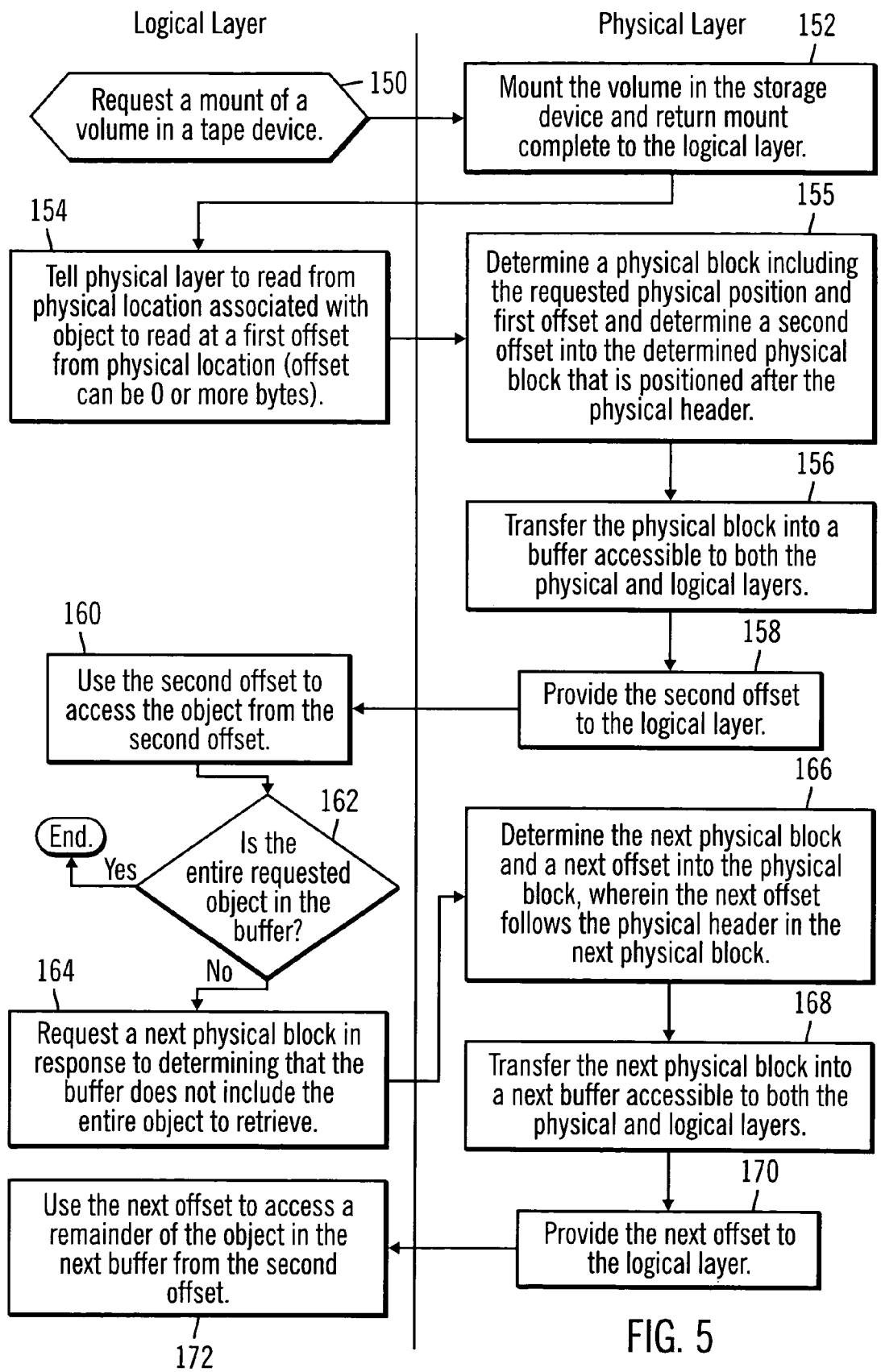

FIG. 5 illustrates an embodiment of operations performed by the logical layer 10 and physical layer 12 to retrieve data from the storage device 14. Control begins at block 150 with the logical layer 10 issuing a request to the physical layer 12 to mount a volume in a storage device 14. In response, the physical layer 12 mounts (at block 152) the storage device 14, i.e., sequential access device, including the requested volume; return mount complete to the logical layer. The logical layer 10 then requests (at block 154) that the physical layer 12 read from a physical location associated with object to read at a first offset from the physical location, where the first offset can be zero or more bytes. This physical location requested by the logical layer 10 may be in the middle of a physical block 16, but represents the starting point of the object. The first offset may be greater than zero if the logical layer 10 wants to read starting from a location within the object. The physical location associated with the object to retrieve may comprise the physical location 74 associated with the identifier 72 (FIG. 3) of the object maintained in the object database 18. Thus, the current position the logical layer 10 obtained from the physical layer 12 when writing the logical block is subsequently presented to the physical layer 12 to retrieve an object or an offset within the object. This request may further indicate a buffer 22 the logical layer 10 allocates for the requested data.

The physical layer 12 determines (at block 155) a physical block including the requested physical position and first offset and further determines a second offset into the determined physical block that is positioned after the physical header of the determined physical block. The physical layer 12 issues commands (at block 156) to cause the transfer of the physical block 16 into a buffer 22 accessible to both the physical and logical layers. The transferred physical block 16 may include data other than the requested object, such as additional objects or only part of the requested object. The physical layer 12 further provides (at block 158) the second offset to the logical layer 10. The logical layer 10 uses (at block 160) the second offset to access the object (logical header 52 and application data 54) in the buffer from the second offset. This accessed object at the second offset may comprise the logical header 52 and application data 54 (FIG. 2). If (at block 162) the entire requested logical block is in the buffer 22, then control ends. Otherwise, if (at block 162) the entire requested object is not in the buffer 22, then the logical layer 10 requests (at block 164) a next physical block 16. This request may include a next buffer 22 in which the physical layer 12 will transfer the requested data. In one embodiment, while the logical layer 10 is reading a portion of the requested object in one buffer 22, the next portion of the object may be read into a next buffer 22.

In one embodiment, if the logical layer 10 requests a number of bytes from a start of a physical location and offset (first offset), then the physical layer 12 may determine where the object starts and if the requested object does not cross into a next physical block, i.e., the length of the requested object plus the offset from the physical location does not extend past the end of the buffer, then all the requested object is within the current buffer. If the object crosses into a next physical buffer, then the physical layer 12 accesses the next physical layer and informs the logical layer of the offset to retrieve the data from to bypass the physical header.

In response to the request, the physical layer 12 determines (at block 168) the next physical block 16 and a next offset into the physical block, where the next offset follows the physical header in the next physical block to point to the data 54. The next offset is provided (at block 170) to the logical layer 10 and the logical layer 10 uses (at block 172) the next offset to access a remainder of the requested object in the next buffer 22 from the next offset.

Figure 6:
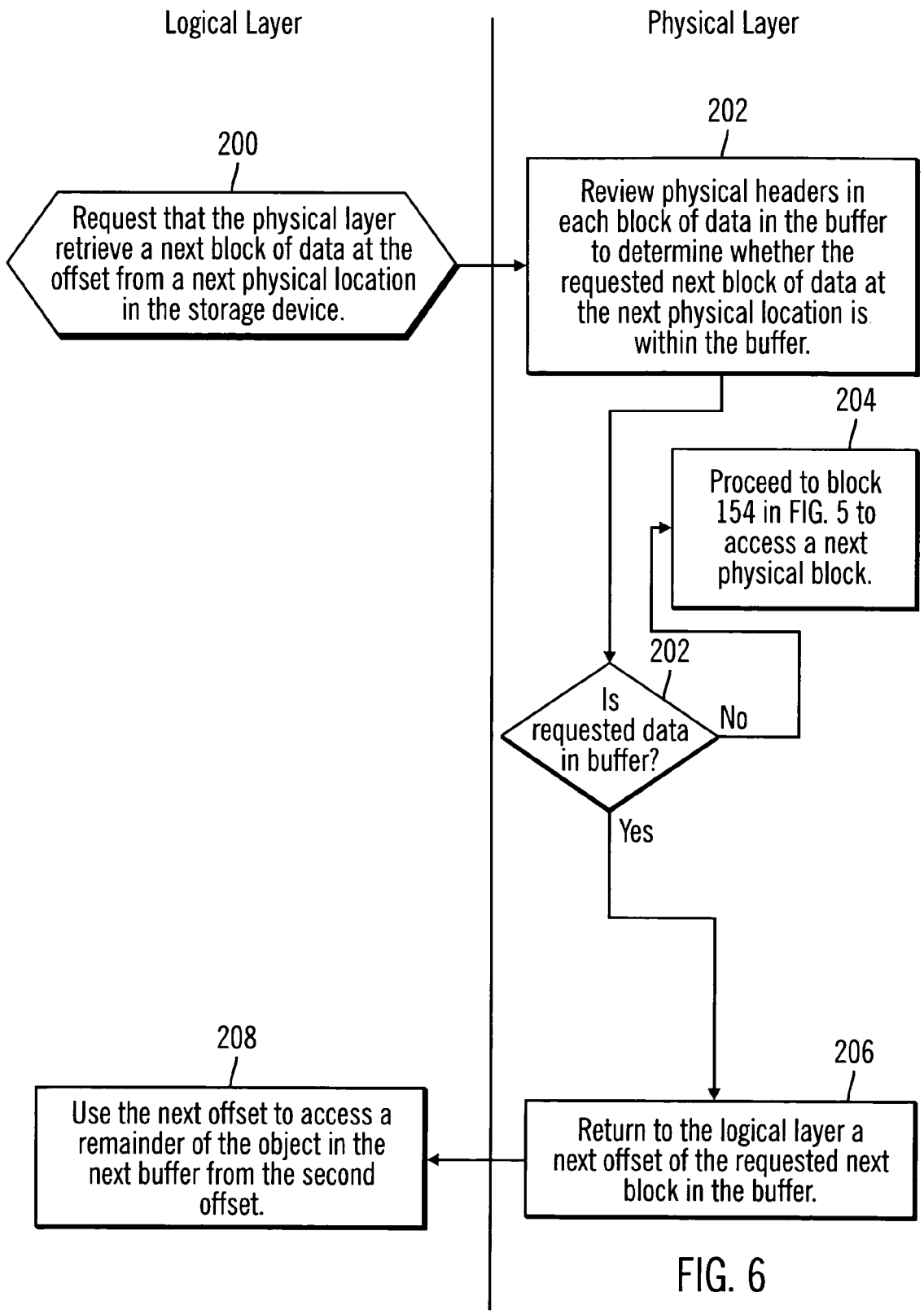

FIG. 6 illustrates a further embodiment of operations performed by the logical 10 and physical 12 layers to retrieve data. The logical layer 10 requests (at block 200) that the physical layer 12 retrieve a next object at the offset from a next physical location in the storage device. This request may be within a series of sequential access requests from the application 20. In response, the physical layer 12 reviews (at block 202) the physical header 50 in the buffer 22 to determine whether the requested next physical location is within the buffer 22. The logical layer 10 may pass with the request a pointer back to the buffer 22 from which the last object was accessed when requesting a next object/physical location from the physical layer 12. If (at block 202) the requested physical location is not in the buffer 22, then control proceeds (at block 204) to block 156 in FIG. 5 to retrieve a next physical block 16 and transfer to a buffer 22. If (at block 202) the requested block is already in the buffer 22, then the physical layer 12 returns (at block 206) to the logical layer 10 a next offset of the requested next block in the buffer 22. The logical layer 10 uses (at block 208) the next offset to access the object, i.e., the logical header 52 and application data 54, in the buffer from the next offset. With the operations of FIG. 6, data may be returned to the logical layer 10 without having to transfer data from the storage device 14 if all or part of the requested logical block is already in the buffer 2.

In additional embodiments, certain of the headers may not be written. For instance, if data is being transferred from a disk storage device to a sequential access device, such as tape storage, data may be written to the disk with an empty physical header 50 having a length equal to the tape device physical header 50. This provides room for the physical layer of the sequential access (tape) device to add a physical header 50 when data is being transferred from disk to tape. Further, if data is being transferred among many different types of devices, including different tape devices, the logical layer 10 may always reserve a physical header 50 with every block being created that is of sufficient length to accommodate the largest physical header 50 used among the devices. Providing space for a physical header with data stored in disk allows direct I/O transfer between heterogeneous storage devices. There may be a separate physical layer for each supported device.

With described embodiments, the logical 10 and physical layer 12 share a buffer and access data from this same buffer and write header information to this same buffer, and pass pointers to the buffer to each other to transfer data.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In one embodiment, the logical layer transfers objects to and from the storage device 14. In alternative embodiments, data units or structures other than objects may be the subject of the transfer operations.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   allocating, by a logical layer, a buffer to use to write data to a storage device, wherein a physical layer manages access to the storage device;
   determining, by the logical layer, an offset into the buffer based on a length of a physical header written by the physical layer;
   writing, by the logical layer, data to the buffer from the determined offset;
   writing, by the physical layer, physical header information, wherein the physical header information does not extend past the offset in the buffer; and
   transferring, by the physical layer, content from the buffer to the storage device.

2. The method of claim 1, further comprising:
   receiving, by the logical layer, information from the physical layer indicating a physical header length and a block size for the storage device, wherein a size of the allocated buffer is the block size of the storage device, and wherein the offset is based on the physical header length information received from the physical layer.

3. The method of claim 1, wherein the physical layer writes the physical header starting from a start of the buffer.

4. The method of claim 1, wherein the data written by the logical layer starting from the offset includes a logical header followed by application data.

5. The method of claim 1, wherein the data to write to the storage device comprises an object, wherein the storage device comprises a sequential access device, further comprising:
   requesting, by the logical layer, from the physical layer a current position of the sequential access device to which the object is written;
   associating, by the logical layer, the requested current position of the sequential access device with the object to write; and
   using, by the logical layer, the current position associated with the written object when subsequently requesting the object from the physical layer.

6. The method of claim 1, wherein the storage device comprises a random access device or sequential access device, wherein the physical layer writes physical header information if the storage device comprises a sequential access device, and wherein the physical layer does not write physical header information to the buffer if the storage device comprises a random access device.

7. A method, comprising:
   requesting, by a logical layer, that a physical layer retrieve a block of data at a first offset from a physical location in a storage device, wherein the first offset may comprise zero or more bytes;
   determining, by the physical layer, a physical block including the requested first offset from the physical location;
   determining, by the physical layer, a second offset into the determined physical block pointing to a start of the block of data at the first offset from the physical location;
   transferring, by the physical layer, the physical block into a buffer accessible to both the physical and logical layers;
   providing, by the physical layer, the second offset to the logical layer; and
   using, by the logical layer, the second offset to access the block of data in the buffer from the second offset.

8. The method of claim 7, wherein each physical block includes a physical header, further comprising:
   requesting, by the logical layer, a next physical block in response to determining that the buffer does not include all the block of data to retrieve;
   determining, by the physical layer, the next physical block and a next offset into the physical block, wherein the next offset follows the physical header in the next physical block;
   transferring, by the physical layer, the next physical block into a next buffer accessible to both the physical and logical layers;
   providing, by the physical layer, the next offset to the logical layer; and
   using, by the logical layer, the next offset to access a remainder of the requested block of data in the next buffer from the next offset.

9. The method of claim 7, wherein the storage device comprises a tape device, further comprising:
   maintaining, by the logical layer, a current position in the tape device for each object written to the tape device, wherein the requested physical location comprises the maintained current position for the object to retrieve and the second offset bypasses a physical header at the current position written by the physical layer.

10. The method of claim 7, wherein each block of data stored in the storage device includes a physical header added by the physical layer followed by a logical header added by the logical layer, wherein the second offset points to the logical header of the block of data to retrieve in the physical block transferred to the buffer.

11. The method of claim 7, wherein the physical block transferred to the buffer includes a plurality of objects, further comprising:
   requesting, by the logical layer, that the physical layer retrieve a next object at a next offset from a next physical location in the storage device;
   reviewing, by the physical layer, the physical headers in blocks in the buffer to determine whether the requested next object at the next physical location is within the buffer; and
   returning, by the physical layer, to the logical layer a third offset of the requested next block in the buffer in response to determining that the requested next block of data is in the buffer, wherein the requested next block of data is available to the logical layer in the buffer without having to transfer data from the storage device.

* * * * *